United States Patent
Rebella et al.

(10) Patent No.: US 9,686,188 B2
(45) Date of Patent: Jun. 20, 2017

(54) METHOD AND APPARATUS FOR NODE REALIGNMENT IN A TELECOMMUNICATIONS NETWORK

(75) Inventors: Paolo Rebella, Bergeggi (IT); Daniele Ceccarelli, Genoa (IT); Diego Caviglia, Vallingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 166 days.

(21) Appl. No.: 14/428,076

(22) PCT Filed: Sep. 13, 2012

(86) PCT No.: PCT/EP2012/067981
§ 371 (c)(1),
(2), (4) Date: Mar. 13, 2015

(87) PCT Pub. No.: WO2014/040628
PCT Pub. Date: Mar. 20, 2014

(65) Prior Publication Data
US 2015/0244614 A1    Aug. 27, 2015

(51) Int. Cl.
*H04L 12/723* (2013.01)
*H04L 12/733* (2013.01)
*H04L 12/707* (2013.01)
*H04L 12/703* (2013.01)
*H04W 76/02* (2009.01)

(52) U.S. Cl.
CPC .............. *H04L 45/50* (2013.01); *H04L 45/20* (2013.01); *H04L 45/22* (2013.01); *H04L 45/28* (2013.01); *H04W 76/028* (2013.01)

(58) Field of Classification Search
None
See application file for complete search history.

(56) References Cited

U.S. PATENT DOCUMENTS

| | | | |
|---|---|---|---|
| 7,130,304 B1 * | 10/2006 | Aggarwal | H04L 45/00 370/389 |
| 7,359,377 B1 * | 4/2008 | Kompella | H04L 45/50 370/254 |
| 7,680,028 B1 * | 3/2010 | Zamfir | H04L 12/5695 370/216 |

(Continued)

OTHER PUBLICATIONS

"PCT International Search Report for PCT Counterpart Application No. PCT/EP2012/067981", (May 31, 2013), 3 pages.

(Continued)

*Primary Examiner* — Jenee Williams
(74) *Attorney, Agent, or Firm* — NDWE LLP

(57) ABSTRACT

A method of realigning a node in a label switched network comprising a plurality of nodes and a node with a processor, a memory, and a network interface, for carrying out the method. The method includes periodically maintaining backup path status information for the node, restarting the node, and re-establishing label switched paths with the plurality of nodes using the backup status information. Communication with adjacent nodes is carried out in order to reconcile the path status information with respective path status information in the adjacent nodes in order to establish node realignment preferably judged against a threshold value for path reliability.

6 Claims, 4 Drawing Sheets

(56) References Cited

U.S. PATENT DOCUMENTS

| | | | | |
|---|---|---|---|---|
| 8,040,793 | B2* | 10/2011 | Gao | H04L 41/0654 370/218 |
| 2002/0036989 | A1* | 3/2002 | Payton | H04L 12/1854 370/254 |
| 2003/0189947 | A1* | 10/2003 | Beshai | H04L 12/5693 370/428 |
| 2005/0018599 | A1* | 1/2005 | Mahasoom | H04L 45/28 370/216 |
| 2005/0185621 | A1* | 8/2005 | Sivakumar | H04L 1/1887 370/335 |
| 2006/0002368 | A1* | 1/2006 | Budampati | H04L 45/22 370/351 |
| 2006/0023677 | A1* | 2/2006 | Labrador | H04L 45/42 370/338 |
| 2006/0072461 | A1* | 4/2006 | Luong | H04L 45/02 370/236 |
| 2006/0098608 | A1* | 5/2006 | Joshi | H04L 45/123 370/338 |
| 2006/0126496 | A1* | 6/2006 | Filsfils | H04L 45/02 370/216 |
| 2006/0164975 | A1* | 7/2006 | Filsfils | H04L 45/00 370/225 |
| 2007/0121486 | A1* | 5/2007 | Guichard | H04L 45/02 370/216 |
| 2007/0286097 | A1* | 12/2007 | Davies | H04L 45/02 370/255 |
| 2008/0084890 | A1* | 4/2008 | Kompella | H04L 45/02 370/400 |
| 2009/0147731 | A1* | 6/2009 | Chion | H04L 47/10 370/328 |
| 2009/0268605 | A1* | 10/2009 | Campbell | H04L 41/12 370/216 |
| 2009/0296668 | A1* | 12/2009 | Capone | H04W 72/1257 370/337 |
| 2009/0310482 | A1* | 12/2009 | Asaie | G06F 11/1443 370/225 |
| 2010/0128680 | A1* | 5/2010 | Coletti | H04L 12/5695 370/329 |
| 2011/0090786 | A1* | 4/2011 | Liu | H04L 12/5695 370/221 |
| 2011/0142056 | A1* | 6/2011 | Manoj | H04L 45/00 370/400 |
| 2011/0235504 | A1* | 9/2011 | Nozaki | H04L 45/04 370/221 |
| 2012/0014246 | A1* | 1/2012 | Matsumoto | H04L 41/0803 370/221 |
| 2013/0242717 | A1* | 9/2013 | Fujii | H04L 45/507 370/216 |
| 2015/0109943 | A1* | 4/2015 | Sahin | H04W 48/16 370/252 |
| 2016/0029403 | A1* | 1/2016 | Roy | H04W 72/0406 370/336 |

OTHER PUBLICATIONS

Jiangweilian, et al., "Mechanism of multiple adjacent nodes RSVP graceful restart Simultaneously", draft-jian-ccamp-multinodes-rsvp-restart-00, *Network Working Group Internet Draft, The Internet Society*, (Nov. 20, 2005), 12 pages.

Rahman, et al., "RSVP Graceful Restart Extensions", draft-rahman-rsvp-restart-extensions-00.txt, (Oct. 2003), 9 pages.

Satyanarayana, et al., "Extensions to GMPLS Resource Reservation Protocol (RSVP) Graceful Restart", *RFC 5063, The IETF Trust*, http://tools.ietf.org/html/rfc5063 (Sep. 2007), 24 pages.

Wu, et al., "Recovery from control plane failures in the CR-LDP and O-UNI signalling protocols", *Design of Reliable Communication Networks, 2003. (DRCN 2003). Proceedings. Fourth International Workshop on, IEEE*, (Oct. 19-22, 2003), pp. 139-146.

Wu, et al., "Recovery from control plane failures in the LDP signalling protocol", *Optical Switching and Networking, ELSEVIER*, (2005), pp. 148-162.

International Preliminary Report on Patentability, Application No. PCT/EP2012/067981, dated Mar. 26, 2015, 9 pages.

* cited by examiner

METHOD AND APPARATUS FOR NODE REALIGNMENT IN A TELECOMMUNICATIONS NETWORK

CROSS-REFERENCE TO RELATED APPLICATIONS

This application is a National stage of International Application No. PCT/EP2012/067981, filed Sep. 13, 2012, which is hereby incorporated by reference.

TECHNICAL FIELD

This invention relates to a method of realigning a node in a label switched network and to a node for use in a label switched network.

BACKGROUND

A telecommunications network is typically made up of a plurality of nodes which are interconnected. Routes are created through the network by choosing a set of links between the nodes so that a route can enter the network at an ingress node, traverse the network by hopping between nodes via the links and exit the network at an egress node. Typically each node has knowledge of the routes traversing that node.

Periodically, it is necessary for nodes to be restarted. Prior to the restart, it is likely that one or more route will traverse the node and thus after a restart it is necessary for the node to recover the state information about routes traversing the node in order to successfully allow the one or more routes to be resurrected after the restart. This recovery of state is typically termed "realignment" of the node.

In the prior art, two approaches typically have been used to realign nodes following a restart. In the first approach, nodes carry out periodic backups of their state to some form of non-volatile memory and are then able to restore that state following a restart. In a traditional circuit-based domain this approach is called "hard state". In such a network (typically a time division multiplex (TDM) or dense wavelength division multiplex (DWDM) network) the circuit paths are generally quite static and do not vary over short periods of time. Thus periodic snapshots taken in the form of backups, generally work quite well because the routes in the network are unlikely to have changed in any significant way between backups. However, if significant changes to the network have been made, a very large manual effort is required to reconcile the local circuit status with the actual network status following a restart.

In other types of networks such as packet switched networks, for example Internet protocol (IP) or multi-protocol label switched (MPLS) networks, the routes change much more quickly than in traditional circuit-based networks. Accordingly a second approach to node restart has been made for this type of network, which involves a restarted node talking to neighbouring nodes in the network, i.e. nodes which are interconnected with the restarted node to gain state information about the routes in place before the restart. In the context of such networks this type of restart is known as a "graceful restart" and is described in Internet Request for Comments (RFC) 5063. This prior art graceful restart procedure assumes that only one node restarts at a time. However, if multiple restarts occur, the information available from neighbouring nodes as postulated in RFC 5063, is likely to be incomplete and the resurrection of previous routes will fail. Furthermore, if the network has fast changing routes, a backup and restore method will also fail because route changes since the last backup will often be too great and thus the restarted node will have an unacceptably outdated restarted state.

Thus there is a need for recovery of node state information to be possible in the event of multiple node restarts in a network having relatively rapid changes in routing.

It is an object of the present invention to overcome at least some of the problems of the prior art node restart approaches described above.

SUMMARY

The present invention provides a method of realigning a node in a label switched network Typically the network will have a plurality of nodes and the method includes periodically maintaining backup path status information for the node. In response to restarting the node, the label switched paths are re-established with the other nodes in the network using the backup status information. This is achieved by communicating with an adjacent node in order to establish a path reliability value for each path recorded in the backup status information using a reliability value from an adjacent node, in order to establish node realignment.

Advantageously, during restart, the node maintains a path reliability value for a path traversing the node. These path reliability values may be exchanged with adjacent nodes for a path traversing the adjacent nodes to establish a cumulative path reliability value for the path. In this way, the probability of the path being a valid path may be increased since the existence of the path is based upon multiple stored backups in the network rather than just the backup status information of the single node being restarted.

Preferably the cumulative path reliability value is compared with a path reliability threshold to determine whether the related path is reliable and thus may be considered to be a path which was in existence before the node restart. Advantageously the path reliability threshold is a function of the number of Hops in the related path.

The invention also provides a node for use in a label switched network comprising a plurality of nodes. The node includes a processor which is operable periodically to create a backup status record for the nodes. The node also includes a memory arranged to store the backup status record and a processor arranged to restart the node on command and the restore the node to a state defined by the backup status record. The processor is also arranged to calculate a path reliability value. The node has a network interface which is operable to receive path status information and path reliability values from adjacent nodes.

Following a restart, the node may receive a path reliability value from an adjacent node and the processor may modify the received path reliability value dependent on an internally held path reliability value for the same path. This modified path reliability value may then be passed to another adjacent node. The processor may be arranged to modify the path reliability value to establish a cumulative path reliability value for the path. The processor may further be arranged to compare the cumulative path reliability value with a path reliability threshold to determine whether the related path is reliable and thus may be properly set up following the restart. Preferably the processor is arranged to calculate the path reliability threshold as a function of the number of Hops in the related path.

The invention also provides a computer program product which, when executed on a computer, causes the computer to carry out the method of the invention.

BRIEF DESCRIPTION OF THE DRAWINGS

Embodiments of the invention will now be described by way of example with reference to the drawings, in which.

DETAILED DESCRIPTION

The invention is described below in connection with generalised multi-protocol label switching (GMPLS) but the technique is applicable to any network having multiple nodes and routes set up through those nodes and in particular, to label-switched nodes.

Typically in such a network, a node or "network element" (NE) may be restarted due to a software problem or normal maintenance. The restart of the control unit in the NE causes re-initialisation of the control plane meaning that the control plane information about the label switched paths (LSPs) in the Network Element (NE) may be lost. Typically the data plane is unaffected.

Briefly, the NE stores periodic backup files of the path status, restores itself according to this backup file and then communicates with adjacent nodes to test the validity and currency of the backup file. This is described in more detail below.

In general terms, a particular LSP is considered to be valid when a significant number of the NEs traversed by that LSP also have the same information relating to that LSP. Hence, the more NEs that have recorded the existence of an LSP immediately before the NE restart, the more likely it is that the LSP was indeed current before the restart and had not been removed.

Figure 1:
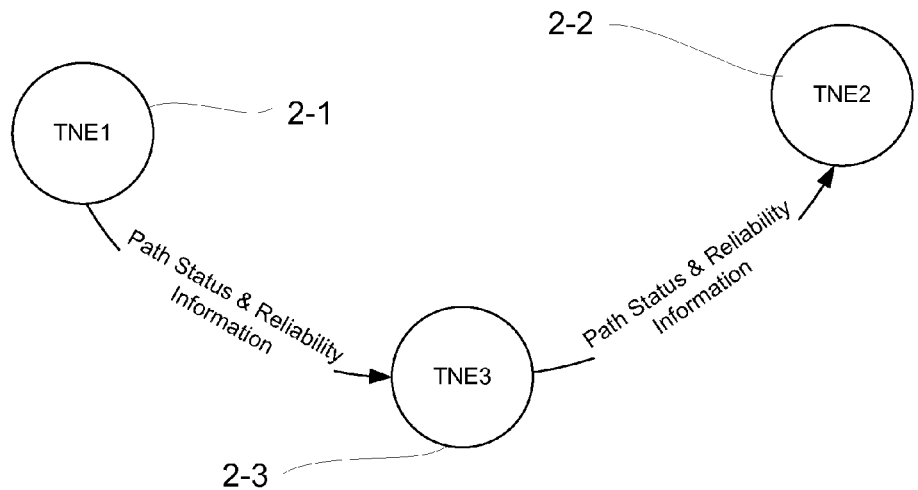
FIG. 1 is a schematic block diagram of several nodes in a network.
Figure 2:
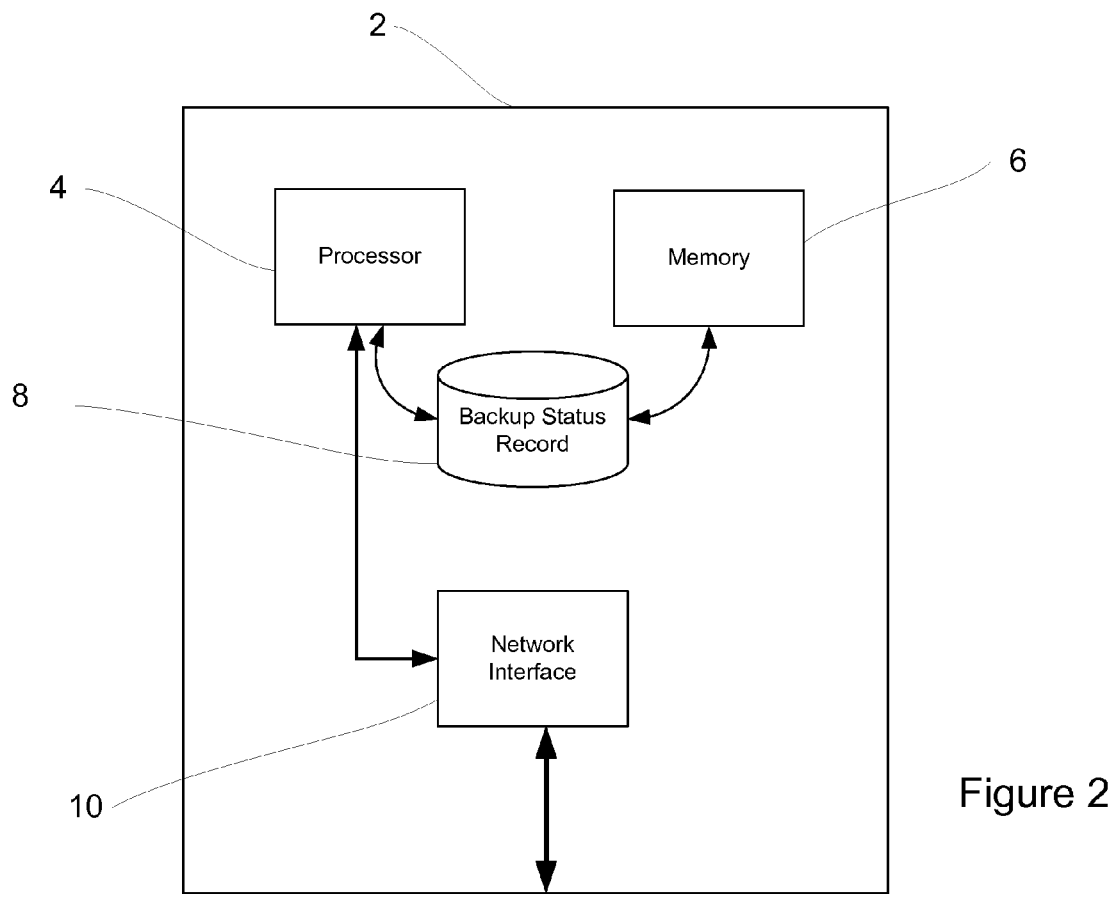
FIG. 2 is a schematic block diagram of a node.

Thus with reference to FIG. 1, NE1, NE2 and NE3, 2-1, 2-2 and 2-3 are located in a GMPLS network and are able to communicate path status and reliability information between themselves. With reference also to FIG. 2, each NE 2 has a processor 4, a memory 6 and a network interface 10. The processor is able to cooperate with the memory 6 to create a backup status record 8 and to communicate with the other NEs via the network interface 10.

During a restart, link management protocol (LMP) information is used in order to determine if an neighbouring node which is typically a node a single Hop away, is UP or DOWN. When the first control channel with an adjacent NE is up then the adjacency with that NE is considered to be UP and when the last control channel of an adjacent NE goes down, the adjacency with that NE is considered to be DOWN and it is likely that the neighbouring, or adjacent, NE has restarted.

In order to realign a neighbour, different Notify messages are used as explained below in connection with FIGS. 3 and 4.

The realignment procedure uses three new Notify messages:
Notify_Add; Notify_Upgrade and Notify_Delete.

The new realignment procedure also uses the concept of an LSP Degree of Reliability which is explained in detail below.

LSP Degree of Reliability

An adjacent NE i.e. any NE which is traversed by a particular LSP, can be in two different states; namely Aligned or Restarted. Also information about an LSP can be Reliable or Not_Reliable and with a certain degree of reliability.

An adjacency is considered to be Aligned when if viewed from a particular NE, the adjacent NE has information about LSPs which is entirely consistent between the NEs.

When an adjacent NE is considered to be in the Restarted state, it will instead hold information about LSPs which do not have an adequate or consistent degree of reliability compared with an adjacent NE. In the preferred embodiment, the degree of reliability for an LSP which is Reliable is zero whilst a Not_Reliable LSP can have a degree of reliability assuming any value between 1 and $2^8$.

When the two sides of an adjacency, i.e. two NEs linked along an LSP, exchange the same LSP information and the state of the LSP has a degree of reliability indicated as reliable, then the state of that adjacency moves to Aligned.

In order to show how the procedure may be implemented, we define the following parameters:

LSP degree of reliability (DR);
Received DR (R_DR): is the DR that a NE has received at its interface 10;
Propagated DR (P_DR): is the DR that a NE has propagated at its interface 10;
_NE_Unaware: is the number of the NE belonging to the same LSP that is not able to rebuild the LSP using its backup status record 8;
In order to decide when LSP information becomes Reliable, a threshold (Th) is also defined. The threshold preferably depends on the number of hops in the LSP, i.e. the number of links between NEs it must traverse, and on a configurable value. To have an adjacency in the Aligned state all its LSP must have DR=0.

At restart, the NE 2 rebuilds its database retrieving LSP's information from .rpp files from its persistent storage 6 or restored from a backup 8. Because this information is not reliable (it may be out-of-date) the degree of reliability for each LSP is assigned the value DR=1.

When the DR reaches a threshold (Th) value the reliability for an LSP is moved to 0 (Reliable).

Assuming an LSP traverse #_Hops, the rule is
If DR>=Th then DR==0
Where Th=#_Hops/X
X is a configurable value defined on network base.

As explained below, since the DR value gradually increments as the P_DR values propagate through a network, the division by the number of hops helps normalise the threshold value for different sized network. The value X, allows adjustment of the weighting given to the threshold value, Th; a lower value allowing an LSP to be considered Reliable with a larger number of NEs having information about the LSP in their backup data. The relevance of this will become more apparent later.

This procedure is repeated for each LSP in the rebuilt database. Every time there is an LSP "unknown" by an adjacent NE its DR, P_DR and R_DR are considered 'null'. Null values are considered less then 1 but higher then 0; so somewhere between Not_Reliable and Reliable.

Thus is pseudo-code we have:
Procedure
NE Restarted (start):
When a NE restarts, it tries to recover information about all LSPs from .rrp. and sets DR for each LSP to 1 (Not_Reliable).
After this operation the NE tries to bring up the control channels with its neighbours.
For each neighbour with a running control channel the restarted node produces and sends a Notify_Update message with the indication that it is restarted and the list of LSPs it has been able to rebuild with the indication of their DR (DR=1).
P_DR is set to 1.
Each Aligned neighbouring NE (i.e. neighbours that haven't been re-started so have a completely reliable LSP database) receives a Notify_Update from the restarted NE
With respect to the adjacency from where the message is received the NE (Aligned) performs the following checks:
LSP not present locally (DR=null) but reported into the Notify_Update message (R_DR>0): Notify_Delete message is sent to the restarted node for this LSP because NE(Restarted) has an old LSP in its backup.
LSP present locally (DR=0) but not reported in the Notify_Update message received (R_DR=null): Notify_Add message is sent for this LSP with full info needed to rebuild the LSP because NE(Restarted) is missing a valid LSP in its backup.
LSP present locally (DR=0) and also in the Notify_Update message (R_DR>0): Notify_Update message sent with DR=0 (Reliable) for this LSP i.e. NE Restarted has consistent information with NE(Aligned) for this LSP.
When all the LSPs locally present in the NE (Aligned) and reported into the Notify_Update message from its neighbour, have been checked, an indication of "ending procedure" is added to the last Notify message sent.
The NE (Restarted) must process the information received from its Aligned neighbouring NEs.
Thus:
NE Restarted (realigning):
All its LSPs are Not_Reliable and have DR>0 (P_DR as well. DR is considered null for LSPs that it is not aware).
The NE Restarted starts to receive Notify message from its neighbours, and manages these messages in the following way:
Notify_Add received: create the LSP reported (DR=0)
Notify_Delete received: remove the LSP reported (DR=null)
Notify_Update received: set DR in the following way:
If the information about the an LSP with [(R_DR>P_DR) or (P_DR is null and DR is null)] then:
If the NE is Egress/Ingress for the LSP then:
DR==R_DR
If the NE is Transit for the LSP then:
DR=R_DR
a Notify_Update message containing information about the LSP with P_DR =DR is propagated Downstream/Upstream
PDR==DR
If (P_DR is null and DR is null) then: #_NE_Unaware ++
If the information about the LSP with (P_DR is null and DR=1) then
If the NE is Egress/Ingress for the LSP then:
DR==R_DR+DR
a Notify_Update message containing information about the LSP with P_DR=DR is propagated Downstream/Upstream
If the NE is Transit for the LSP then:
DR=R_DR+DR
a Notify_Update message containing information about the LSP with P_DR=DR is propagated on both Downstream and Upstream
PDR==DR
When DR>=Th then
If the LSP traverses the Upstream NE then includes in the Notify_Add message the FullInfo about the LSP with DR=0
If the LSP traverses the Downstream NE then includes in the Notify_Add message the FullInfo about the LSP with DR=0

The state of the LSPs is the same for both the Upstream and Downstream side of the adjacency while the state of the adjacency depends on the state of all circuits it shares with the neighbour.

This is explained in more detail with reference to FIGS. 3 and 4 which show examples of the process in action.

Figure 3:
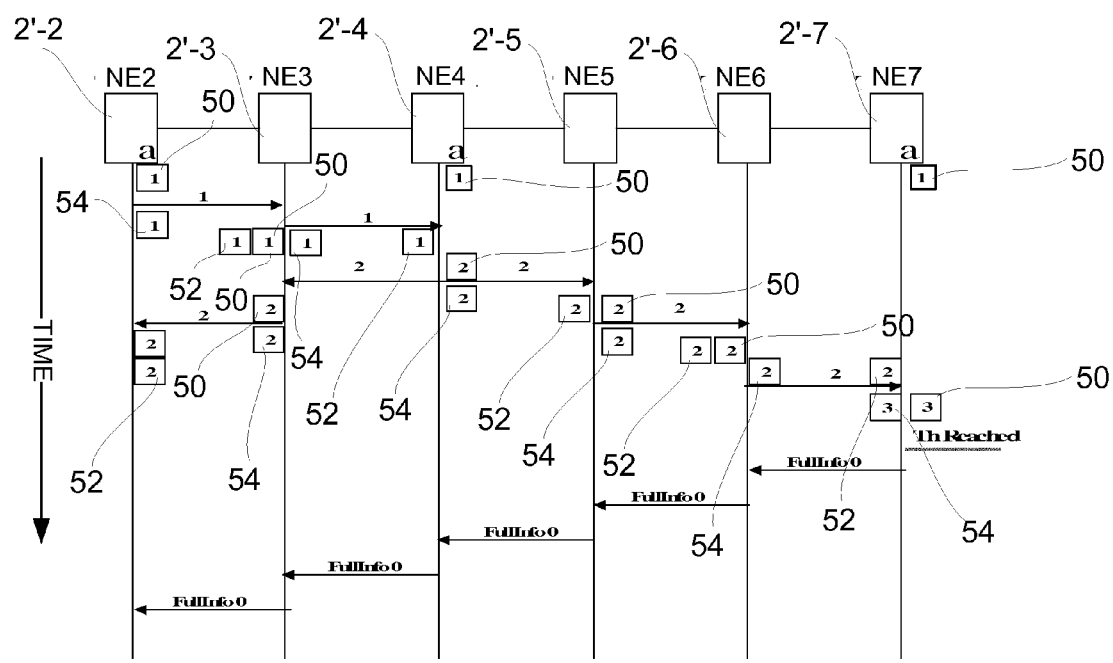
FIG. 3 is a schematic diagram showing the process for establishing a route after node restart.

Firstly, with reference to FIG. 3, all the NEs 2'-2 to 2'-7, have restarted and thus there are no Aligned nodes on which to rely. NEs 2'-2, 2'-4 and 2'-7 recover via .rpp, information about circuit a.

The DR values 50 are shown being incremented as messages pass between the NEs in the direction of the arrows. The R_DR values are labeled 52 and the P_DR values are labeled 54. In this case, Th is set at 3.

It will be seen that at restart, NE 2'-7 only has DR=1 for route a. But NE 2'-2 and NE 2'-4 also have route a in their backup information and thus the cumulative DR increases as it propagates through these NEs.

When P_DR reaches NE7, 2'-7 the DR for route a at NE7 is finally incremented up to the Th threshold and thus this NE is able to issue a Notify_Add message with full setup information and thus allow all the other NEs in the LSP, to set the LSP as reliable (DR=0) and set the route up.

In the discussion above, it has been assumed that DR for an LSP reaches the Th threshold. However, it is necessary to deal with the case in which the Th threshold is not reached for an LSP.

Figure 4:
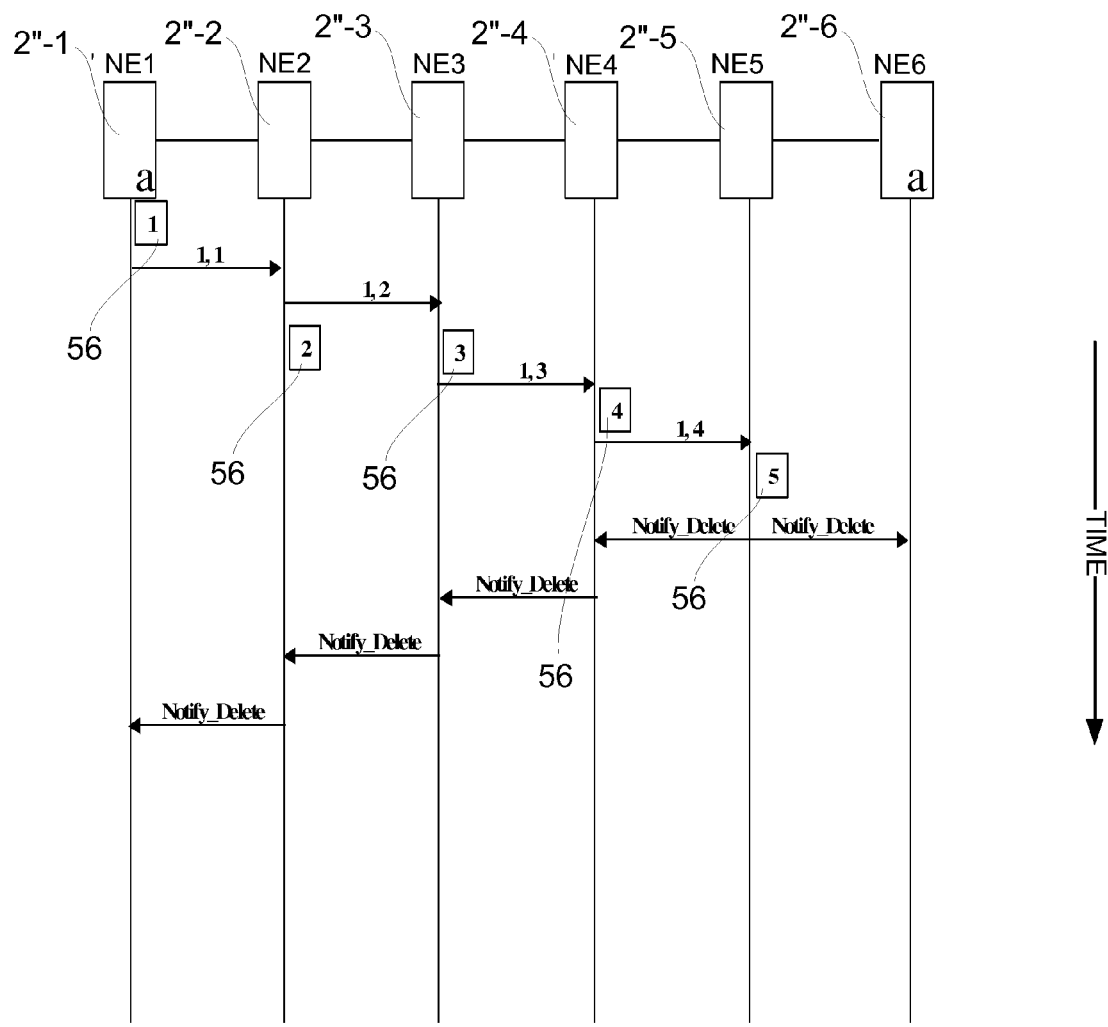
FIG. 4 is a schematic diagram of the process for deleting a route after node restart.

With reference to FIG. 4, an example of the case of all the NEs of an LSP span being restarted but Th not being reached in which case a decision must be made whether to keep or delete an LSP.

The rule used by the NE in order to decide whether to keep or delete the LSP is the following:
If (LSP_Length−#_NE_Unaware)+DR <Th then the LSP can be removed
Where:
LSP_Length is the length of the LSP in hops, known a priori
_NE_Unaware: is the number of the NEs belonging to the same LSP that are not able to rebuild the LSP thanks to the .rpp. When a NE restarted receives a Notify_Update about an LSP unknown, the #_NE_Unaware is incremented by one;
DR is the degree of reliability of the LSP
Th is the threshold
All the NEs have restarted; NE1, 2"-1 and NE6 2"-6 recovers via .rpp, information about circuit a.
The first number on each arrow between NEs is the DR while the second one is the #_NE_Unaware
The boxes 56 represent the cumulative #_NE_Unaware. The Th is again 3.

When the Notify_Update with DR=1 and #_NE_Aware reach the NE 6 2"-6 we have:
LSP_Length: 6
_NE_Aware: 5
DR: 1
Th: 3
So: (6-5)+1<3 and thus it is possible to delete the LSP.

The realignment procedure is closed when all the LSPs a NE shares with a neighbour are in the reliable state, that is, are all with DR=0.

Figure 5:
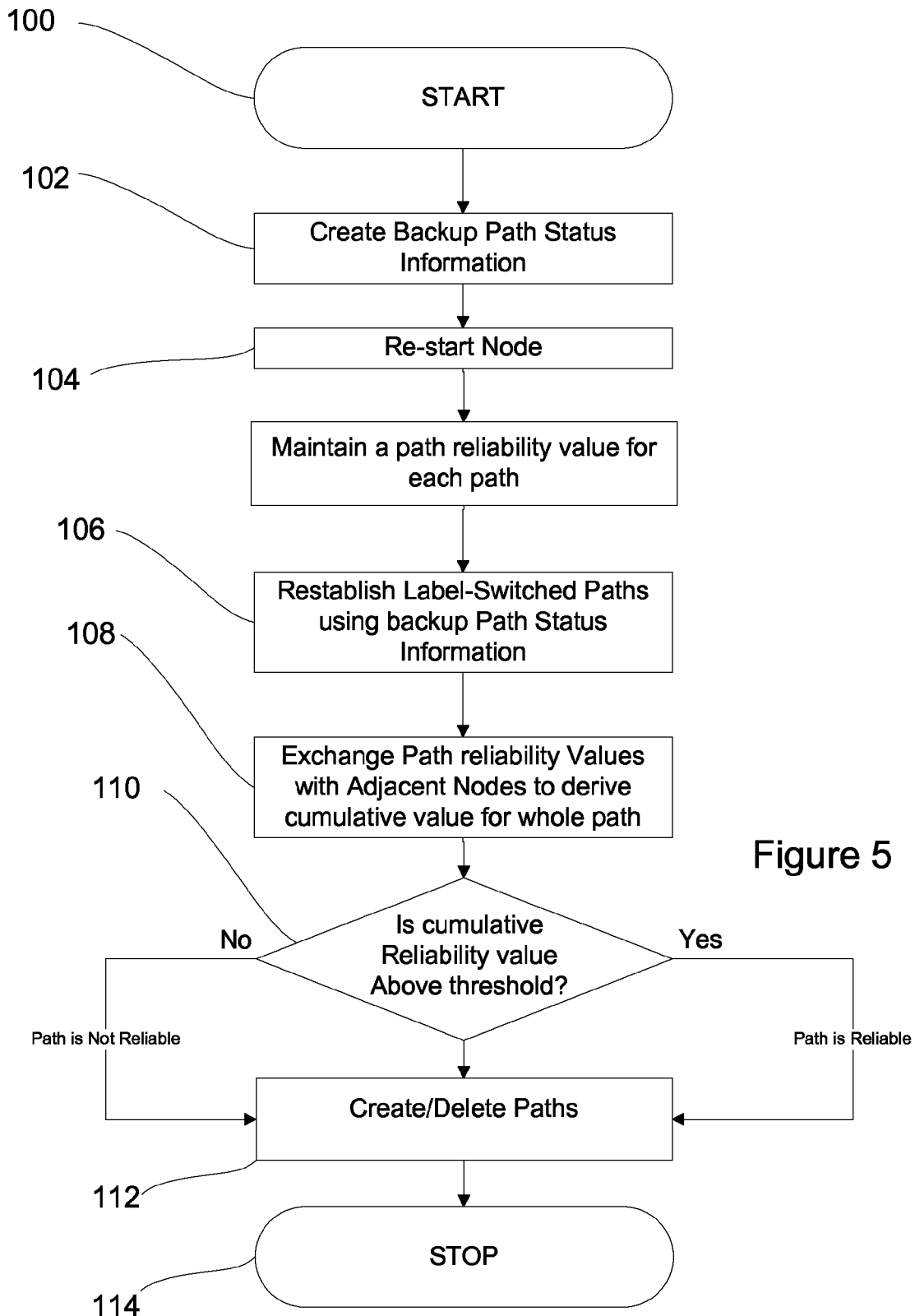
FIG. 5 is a flow chart of a restart procedure.

FIG. 5 summarises the process in Flow-chart form.

The process starts, step 100 and the NE creates a backup, step 102. When the NE restarts, step 104, the NE maintains a path reliability value for each path in the backup, step 105 and begins to re-establish paths, step 106, by exchanging path reliability values with adjacent nodes and deriving a cumulative reliability value for each path, step 108. The cumulative path reliability value is compared with a threshold, step 110 and a decision made whether to create or delete the path, step 112. When all the paths are deemed in a reliable state, the process stops, step 114.

The invention claimed is:

1. A method of realigning a node in a label switched network comprising a plurality of nodes, the method comprising:
periodically maintaining backup status information for the node;
in response to restarting of the node, re-establishing label switched paths with the plurality of nodes using the backup status information; and
communicating with an adjacent node in order to establish a cumulative path reliability value for a path recorded in the backup status information using a reliability value, wherein the node sends a restart update message with the reliability value along the path and wherein a respective node of the plurality of nodes along the path modifies the reliability value when the path is recorded in the respective node's backup status information, in which the cumulative path reliability value is obtained for the path based on a number of nodes modifying the reliability value, wherein when the cumulative path reliability value reaches a path reliability threshold value, the path is deemed reliable in order to establish node realignment, and when the cumulative path reliability value does not reach the path reliability threshold value, comparing base on a number of hops in the path and a number of nodes along the path which do not have the path recorded in their backup status information to the cumulative path reliability value to determine if the path is to be deleted.

2. The method as claimed in claim 1, wherein the path reliability threshold value is a function of the number of hops in the path.

3. A node for use in a label switched network comprising a plurality of nodes, wherein a restarting node of the plurality of nodes sends a restart update message with a reliability value along a path recorded in a backup status information of the restarting node and wherein a respective node of the plurality of nodes along the path modifies the reliability value when the path is recorded in the respective node's backup status information, in which a cumulative path reliability value is obtained for the path based on a number of nodes modifying the reliability value along the path, wherein when the cumulative path reliability value reaches a path reliability threshold value, the path is deemed reliable in order to establish node realignment, and when the cumulative path reliability value does not reach the path reliability threshold value, comparing based on a number of hops in the path and a number of nodes along the path which do not have the path recorded in their backup status information to the cumulative path reliability value to determine if the path is to be deleted, the node comprising:
a processor operable periodically to create a backup status record for the node;
a memory coupled to the processor and arranged to store the backup status record;
a network interface coupled to the processor;
the processor arranged to re-start the node on command and to restore the node to a state defined by the backup status record;
the processor further arranged to receive, via the network interface, path reliability value based on the reliability value for the path from an adjacent node, modify the received path reliability value dependent on having the path recorded in the backup status record at the node, and send the modified path reliability value to another adjacent node along the path in order to obtain the cumulative path reliability value; and
the processor further arranged to receive, via the network interface, a node unaware value from the adjacent node based on a number of node or nodes which do not have the path recorded in their back status information, modify the received unaware value dependent on not having the path recorded in the backup status record at the node, and send the modified unaware value to another adjacent node along the path in order to obtain the number of nodes along the path which do not have the path recorded in their backup status information.

4. The node as claimed in claim 3, wherein the processor is arranged to modify an internally held path reliability value to establish the modified path reliability value for the path.

5. The node as claimed in claim 4, wherein the processor is arranged to calculate the path reliability threshold values as a function of the number of hops in the path.

6. A non-transitory machine-readable storage medium having computer code stored therein, which when executed by a set of one or more processors of a node in a label switched network comprising a plurality of nodes, causes the node to perform operations comprising:
periodically maintaining backup status information for the node;
in response to restarting of the node, re-establishing label switched paths with the plurality of nodes using the backup status information; and
communicating with an adjacent node in order to establish a cumulative path reliability value for a path recorded in the backup status information using a reliability value, wherein the node sends a restart update message with the reliability value along the path and wherein a respective node of the plurality of nodes along the path modifies the reliability value when the path is recorded in the respective node's backup status information, in which the cumulative path reliability value is obtained for the path based on a number of nodes modifying the reliability value, wherein when the cumulative path reliability value reaches a path reliability threshold value, the path is deemed reliable in order to establish node realignment, and when the cumulative path reliability value does not reach the path reliability threshold value, comparing base on a number of hops in the path and a number of nodes along the path which do not have the path recorded in their backup status information to the cumulative path reliability value to determine if the path is to be deleted.

* * * * *